(12) United States Patent
Davis et al.

(10) Patent No.: US 7,538,723 B2
(45) Date of Patent: May 26, 2009

(54) PERSONAL NAVIGATION DEVICE WITH IMPROVED ANTENNA MOUNTING CONFIGURATION

(75) Inventors: Stephen M. Davis, Blue Springs, MO (US); Joshua C. Reeson, Olathe, KS (US); Joe R. Dejmal, Shawnee, KS (US); Michael R. Wiegers, Baldwin City, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 11/685,399

(22) Filed: Mar. 13, 2007

(65) Prior Publication Data

US 2008/0218408 A1 Sep. 11, 2008

Related U.S. Application Data

(60) Provisional application No. 60/893,091, filed on Mar. 5, 2007.

(51) Int. Cl.
*G01S 1/02* (2006.01)
*G01C 21/00* (2006.01)

(52) U.S. Cl. .................. 342/357.06; 342/419; 701/213

(58) Field of Classification Search ........... 342/357.01, 342/357.06, 357.08, 357.13, 419; 701/213, 701/215

See application file for complete search history.

(56) References Cited

U.S. PATENT DOCUMENTS 5,889,493 A * 3/1999 Endo ..................... 342/357.08
6,128,515 A 10/2000 Kabler et al. ............... 455/566
6,272,349 B1 * 8/2001 McGrath et al. ......... 455/456.3
6,795,770 B1 9/2004 Hanshew et al. ............ 701/213
7,299,129 B2 11/2007 Kalis et al. .................. 701/213
2002/0036593 A1 * 3/2002 Ying .......................... 343/702

FOREIGN PATENT DOCUMENTS

JP 2002077338 A * 3/2002

OTHER PUBLICATIONS

Garmin Nuvi® 310/360 Owner's Manual, Mar. 2006.
Garmin StreetPilot® c330 Owner's Manual, Feb. 2005.
Garmin e Trex® Summit Owner's Manual, May 2000.
Annotated exploded view of Garmin® e Trex® device sold to the public in the United States prior to Jan. 2005.

* cited by examiner

*Primary Examiner*—Dao L Phan
(74) *Attorney, Agent, or Firm*—Samuel M. Korte

(57) ABSTRACT

A personal navigation device includes a GPS receiver for receiving GPS signals from a plurality of GPS satellites; a processing system coupled with the GPS receiver for determining a location of the personal navigation device as a function of the GPS signals; a display coupled with the processing system for displaying information related to the location of the personal navigation device; a housing on which the display is mounted and in which the GPS receiver and processing system are housed; and an antenna coupled with the GPS receiver for assisting in reception of the GPS signals. The antenna is fixedly positioned along a plane that is generally parallel with a plane passing through the housing.

20 Claims, 4 Drawing Sheets

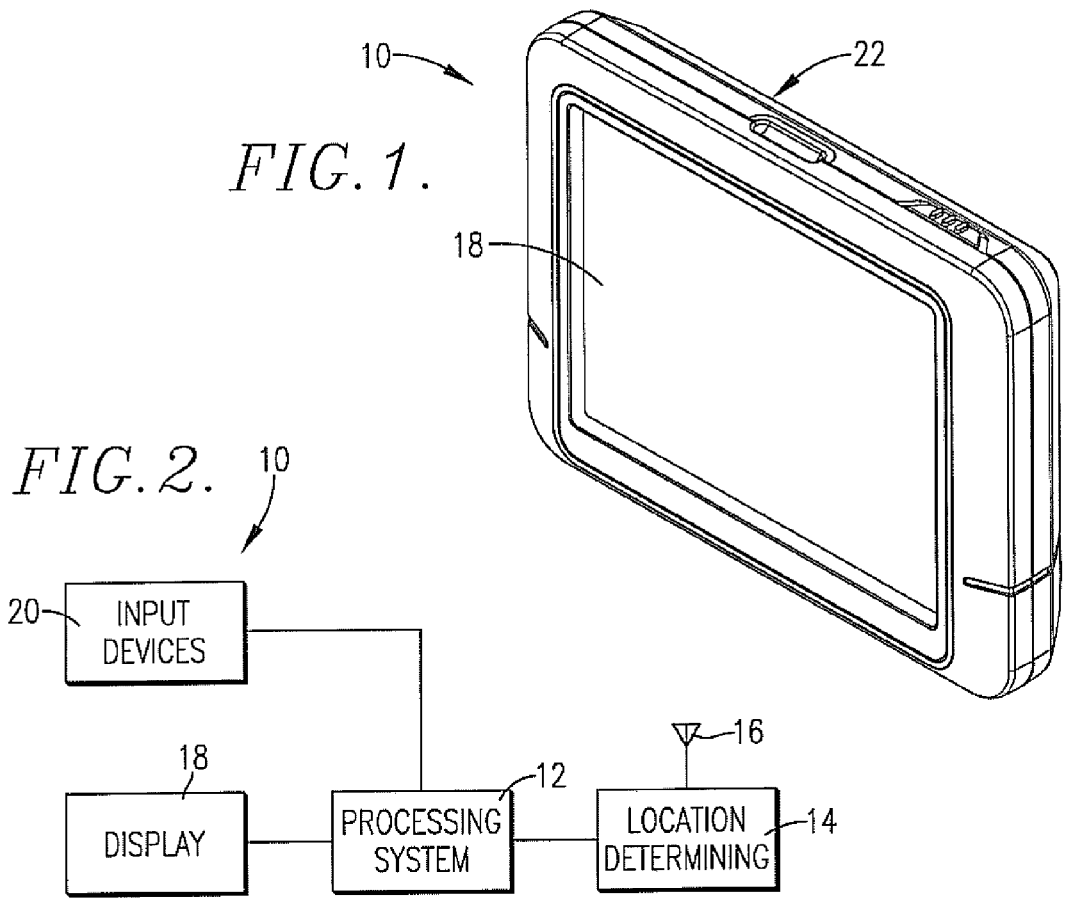
FIG. 1.
FIG. 2.
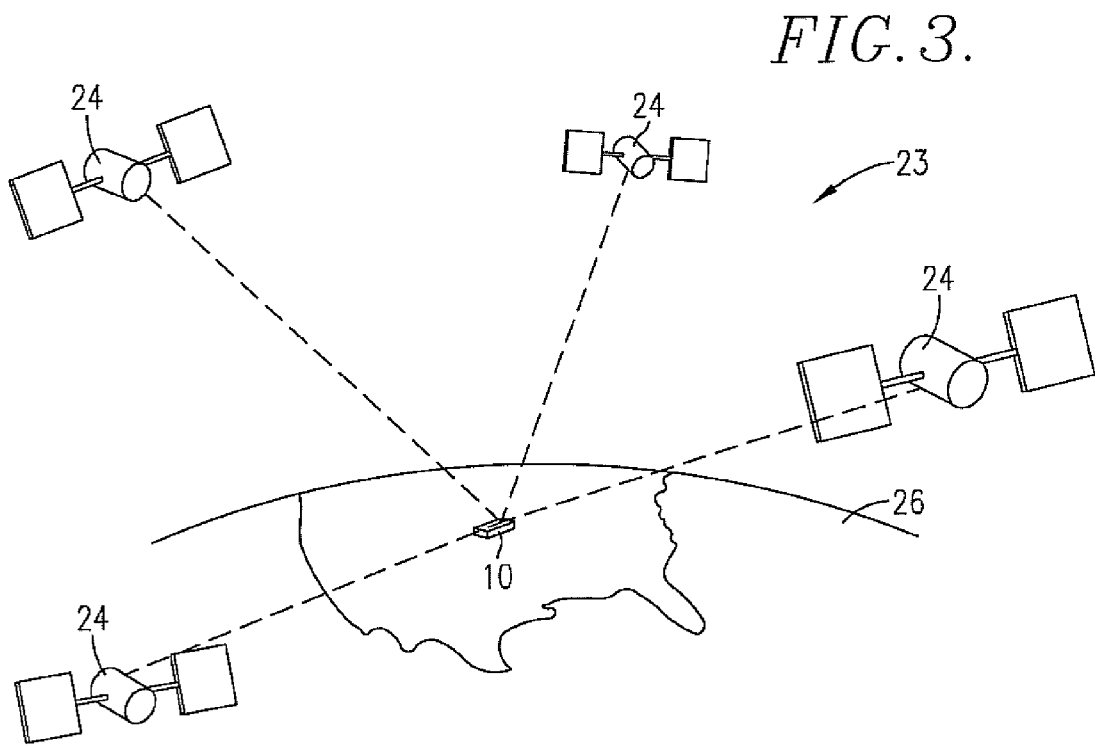
FIG. 3.

PERSONAL NAVIGATION DEVICE WITH IMPROVED ANTENNA MOUNTING CONFIGURATION

CROSS-REFERENCE TO RELATED APPLICATIONS

This non-provisional application claims the benefit of U.S. Provisional Application No. 60/893,091, entitled "PERSONAL NAVIGATION DEVICE WITH IMPROVED ANTENNA MOUNTING CONFIGURATION," filed Mar. 5, 2007, which is herein incorporated by reference in its entirety.

BACKGROUND

1. Field

The present invention relates to portable electronic devices such as personal navigation devices and the like. More particularly, the invention relates to an improved antenna and antenna mounting configuration for personal navigation devices.

2. Description of the Related Art

Global Positioning System (GPS) enabled portable electronic devices such as personal navigation devices (PND), personal data assistants (PDA), mobile telephones, handheld GPS/radios, and the like, are typically equipped with antennas for receiving signals from satellites in a GPS system. These antennas are typically rigidly mounted to external surfaces of the devices or hingedly mounted so they can be extended while the devices are in use and retracted when not in use. Unfortunately, such antenna mounting configurations increase the overall size and detract from the appearance of the portable electronic devices.

SUMMARY

The present invention is directed to a portable electronic device such as a personal navigation device with an improved antenna and antenna mounting configuration. The personal navigation device includes a GPS receiver for receiving GPS signals from a plurality of GPS satellites. A processing system is coupled with the GPS receiver for determining a location of the personal navigation device as a function of the GPS signals. A display is coupled with the processing system for displaying information related to the location of the personal navigation device. A housing, on which the display is mounted, houses the GPS receiver and processing system. An antenna coupled with the GPS receiver for assisting in reception of the GPS signals. The antenna is fixedly positioned along a plane that is generally parallel with a plane passing through the housing. In exemplary embodiments, the personal navigation device includes a circuit board on which the GPS receiver and the processing system are mounted. The antenna is mounted to the circuit board and is entirely enclosed within the housing. In embodiments of the invention, the antenna is positioned entirely within an outer perimeter edge of the circuit board. A ground plane may be provided between the antenna and the circuit board. The antenna is mounted at least partially over the ground plane so that the antenna is positioned along a plane that is generally parallel with the circuit board. In a specific embodiment, a shield fence is attached to the circuit board. The ground plane is positioned at least partially over the shield fence. By mounting the antenna in accordance with the present invention, the housing of the personal navigation device can be made thinner without compromising signal receptivity.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

Embodiments of the present invention are described in detail below with reference to the attached drawing figures, wherein:

FIG. 1 is an isometric view illustrating a personal navigation device constructed in accordance with an exemplary embodiment of the present invention;

FIG. 2 is a block diagram showing selected components of the personal navigation device shown in FIG. 1;

FIG. 3 is schematic diagram illustrating the Global Positioning Satellite (GPS) system;

Figure 4:
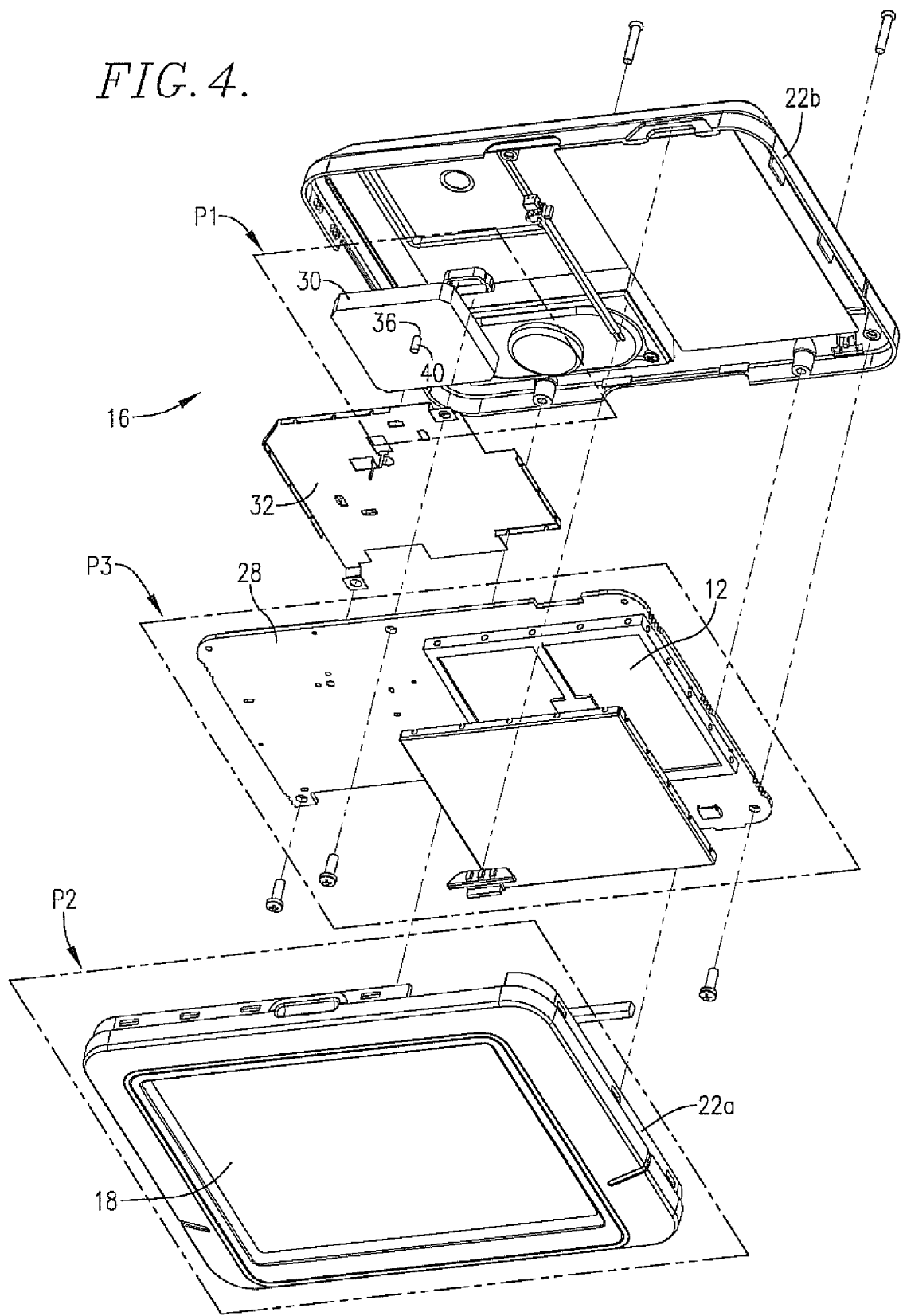
FIG. 4 is a front exploded view of selected components of the personal navigation device shown FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Referring generally to FIGS. 1 through 10, a personal navigation device 10 in accordance with an exemplary embodiment of the present invention is described. As shown in FIGS. 1, 2, 9 and 10, the personal navigation device 10 includes a processing system 12, a location determining component 14, an antenna assembly 16 for the location determining component, a display 18, one or more input devices 20, a housing 22 which encloses and protects the other components from moisture, vibration, and impact, and other components described below. As explained in more detail herein, the antenna assembly 16 is configured and strategically mounted and positioned to optimize reception of external radio frequency signals while minimizing the overall size of the device 10 and eliminating protrusions from the housing 22 of the device 10.

The processing system 12 may include any number of processors, controllers, or other processing systems and resident or external memory for storing data and other information accessed and/or generated by the device 10. The processing system 12 implements one or more software programs which control the display of information on the display 18 and input of information via the one or more input devices 20.

In exemplary embodiments, the location determining component 14 comprises a global positioning system (GPS) receiver or any other device which can determine locations of the marine vessel in which the device 10 is used. In general, the global positioning system (GPS) is a satellite-based radio navigation system capable of determining continuous position, velocity, time, and direction information for an unlimited number of users. FIG. 3 shows one representative view of a GPS denoted generally by reference numeral 23. A plurality of satellites 24 are in orbit about the Earth 26. The orbit of each satellite is not necessarily synchronous with the orbits of other satellites and, in fact, is likely asynchronous. A GPS receiver device 10 such as the ones described in connection with preferred embodiments of the present invention is shown receiving spread spectrum GPS satellite signals from the various satellites 24. The spread spectrum signals continuously transmitted from each satellite 24 utilize a highly accurate frequency standard accomplished with an extremely accurate atomic clock. Each satellite 24, as part of its data signal transmission, transmits a data stream indicative of that particular satellite. The device 10 must acquire spread spectrum GPS satellite signals from at least three satellites for the GPS receiver device to calculate its two-dimensional position by triangulation.

The location determining component 14 is operable to receive navigational signals from the GPS satellites 24 to calculate a position of the device 10 as a function of the signals. The location determining component 14 is also operable to calculate a route to a desired location, provide instructions to navigate to the desired location, display maps and other information on the display screen, and to execute other functions described herein.

The location determining component 14 may include one or more processors, controllers, or other processing systems and memory or may utilize the components of the processing system 12. The memory of the processing system 12 and/or the location determining component 14 may store cartographic data and routing used by or generated by the location determining component 14. The memory may be integral with the location determining component 14, integral with the processing system 12, stand-alone memory, or a combination of both. The memory may include, for example, removable and non-removable memory elements such as RAM, ROM, flash (including microSD cards or the like), magnetic, optical, USB memory devices, and/or other conventional memory elements.

The processing system 12 and the location determining component 14 may be mounted to a printed circuit board 28 in a conventional manner as depicted in FIGS. 4 through 7. In the embodiment illustrated, the circuit board is made of conventional materials and is sized to support all the components of the processing system 12, location determining component 14, and other electronics of the device 10.

Figures 9, 10:
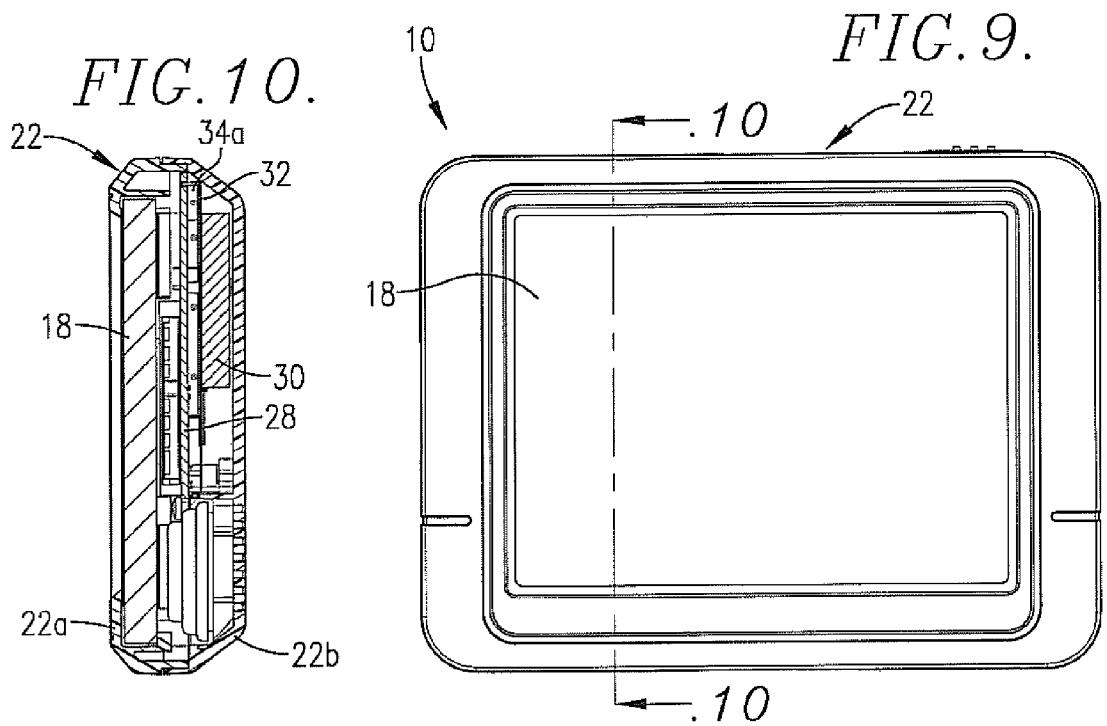
FIG. 9 is a front elevational view of the personal navigation device shown in FIG. 1.
FIG. 10 is a side cross-sectional view of the personal navigation device shown in FIGS. 1 and 9, taken along line 10/10 of FIG. 9.

The display 18 is coupled with the processing system 12 and the location determining component 14 for displaying data and information as described herein. The display 18 may comprise an LCD (Liquid Crystal Diode), TFT (Thin Film Transistor) LCD, CRT (Cathode Ray Tube), LEP (Light Emitting Polymer or PLED (Polymer Light Emitting Diode), or the like, capable of displaying both text and graphical information. The display may be backlit such that it may be viewed in the dark or other low-light environments. As illustrated in FIGS. 1, 9 and 10, the display 18 is preferably positioned on a front face of the housing 22 for ease of viewing.

The input devices 20 may also be positioned on the front surface of the housing 22 such that they may be easily accessed. The input devices 20 may include descriptive markings that identify their function. The inputs may be buttons, switches, keys, an electronic touch-screen associated with the display, voice recognition circuitry, or any other elements capable of controlling the processing system and location determining component.

The housing 22 may be constructed from a suitable lightweight and impact-resistant material such as, for example, plastic, nylon, aluminum, or any combination thereof. The housing may include a front portion 22a and a rear portion 22b and may include one or more appropriate gaskets or seals to make it substantially waterproof or resistant. The housing 22 may also include a location for a rechargeable battery or other power source. The housing may take any suitable shape or size, and the particular size, weight and configuration of the housing may be changed without departing from the scope of the present invention.

As best illustrated in FIGS. 4 through 8 and 10, the antenna assembly 16 includes an antenna 30 and a ground plane 32, and may include one or more shield fences (two shield fences 34a and 34b are illustrated), mounted to the circuit board 28. In exemplary embodiments, the antenna 30 may be a patch-type antenna such as those made by Inpaq Technology Co., Ltd. The patch antenna may be approximately square in shape and generally planar in construction having a thickness less than its length or width. In one specific embodiment, the patch antenna 30 is approximately 25 mm×25 mm square and 4 mm thick, but it may be formed in other sizes and shapes without departing from the scope of the present invention. Ideally, however, the patch antenna 30 is no thicker than about 8 mm. The patch antenna 30 may include a small diameter hole 36 near its center. One embodiment of the patch antenna has an output impedance of approximately 50 ohm and a center frequency of 1575.42 MHz.

The ground plane 32 comprises a generally flat metal surface surrounding the antenna 30 for deflecting errant signals (i.e., multipath) reflected from the ground and other near-by objects. In exemplary embodiment, the ground plane 32 may be formed of approximately 0.2 mm to 0.3 mm thick cold rolled steel with a tin pre-plated coating and is approximately 50 mm×50 mm square. However, the ground plane 32 may be made of other materials and formed in the other sizes and shapes without departing from the scope of the present invention. In the embodiment illustrated, the ground plane 32 is formed with several perimeter notches.

The shield fences 34a and 34b help to shield the antenna 30 and ground plane 32 from the circuit board 28 from electromagnetic fields. In one embodiment, the shield fences 34a and 34b are also made of approximately 0.2 mm to 0.3 mm thick cold rolled steel with a tin pre-plated coating. In the specific embodiment illustrated in FIGS. 4 and 5, one of the shield fences 34b is approximately 20 mm×15 mm and approximately 1.75 mm tall, while the other 34a is approximately 29×34 mm and approximately 1.75 mm tall. However, the shield fences 34*a* and 34*b* may be made of other materials and formed in other sizes and shapes without departing from the scope of the present invention. Moreover, only one shield fence or three or more shield fences may be used rather than two. Further, in exemplary embodiments, the shield fences 34*a* and 34*b* may be eliminated altogether.

Figures 6, 7:
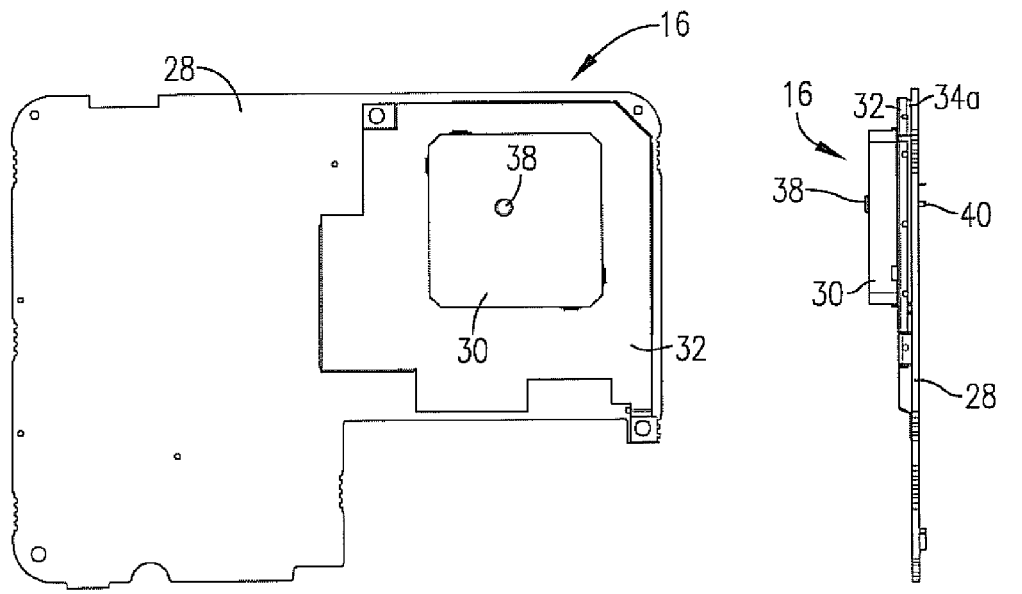
FIG. 6 is a plan view further illustrating the circuit board and certain internal components of the personal navigation device shown in FIGS. 4 and 5.
FIG. 7 is a side elevational view of the circuit board and internal components shown in FIG. 6, taken from the right side.
Figure 8:
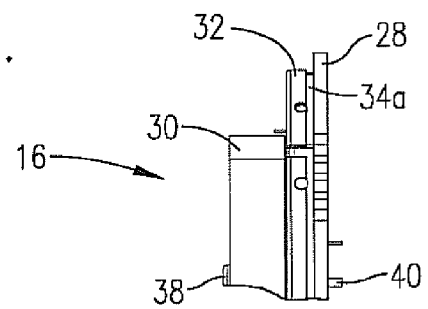
FIG. 8 is an enlarged partial view of the circuit board and internal components shown in FIG. 7.

In the embodiment illustrated, the antenna assembly 16 is mounted to the circuit board 28 by first attaching the two shield fences 34*a* and 34*b* to one face of the circuit board 28 as best illustrated in FIGS. 7, 8 and 10. The shield fences 34*a* and 34*b* may be attached to the circuit board 28 using a suitable fastening technique, such as by adhesives, soldering, or the like. The ground plane 32 is then snapped onto the shield fences 34*a* and 34*b* or otherwise secured using a suitable fastening technique, such as by adhesives, soldering, or the like. In embodiments wherein no shield fences 34*a* and 34*b* are provided, the ground plane 32 may be mounted to the circuit board 28, antenna 30, housing 22, or like component of the personal navigation device 10.

The patch antenna 30 is secured to the exterior face of the ground plane 32 as illustrated. In exemplary embodiments, one face of the patch antenna 30 may be provided with a self-adhesive backing with a release layer. The release layer may be removed to expose the adhesive to secure the patch antenna 30 to the ground plane 32. A conductive post or pin 38 may then be inserted into the small diameter hole 36 in the patch antenna 30 and pushed through the circuit board 28 so that its distal end 40 extends from the face of the circuit board opposite the antenna assembly. The distal end 40 of the post or pin 38 may then be coupled with the GPS receiver or other location determining component of the device to transfer signals there between.

As best illustrated in FIGS. 1, 4, 5, 9 and 10, the patch antenna 30 is entirely enclosed within the housing 22. In a specific embodiment, best illustrated in FIGS. 4, 5 and 6, the antenna 30 is positioned entirely within the outer perimeter edge of the circuit board 28 (i.e., so that the antenna 30 does not extend beyond an outer perimeter edge of the circuit board 28 in any direction). Likewise, the ground plane 32 is positioned entirely within the outer perimeter edge of the circuit board 28 (i.e., so that the ground plane 32 does not extend beyond an outer perimeter edge of the circuit board 28 in any direction). Thus, no part of the patch antenna 30 or the antenna assembly 16 extends beyond the outer confines of the housing.

Figure 5:
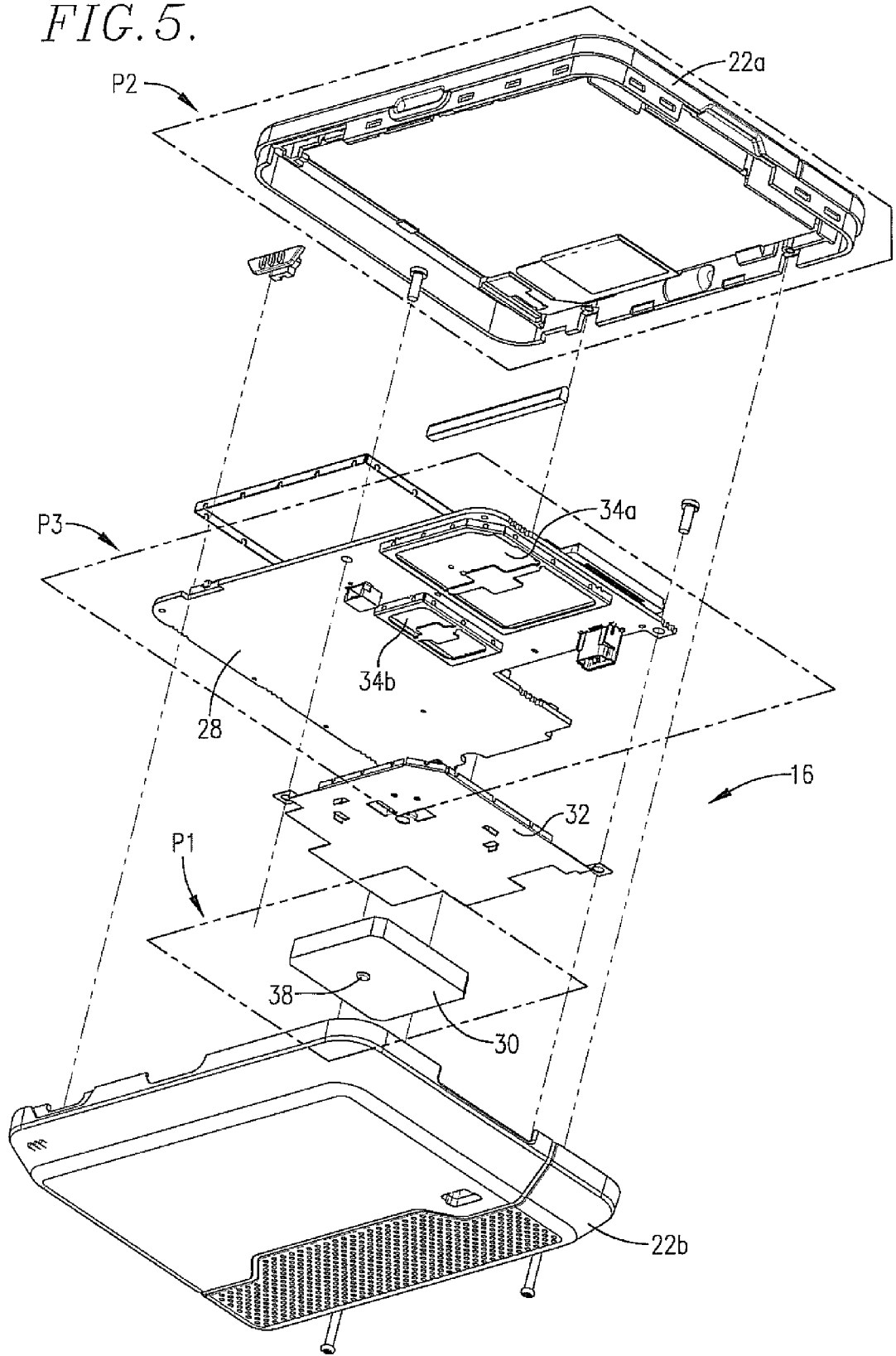
FIG. 5 is a rear exploded view of selected components of the personal navigation device shown in FIG. 1.

As also illustrated, the patch antenna 30 is positioned along a plane identified by P1 in FIGS. 4 and 5. More specifically, the patch antenna 30 is positioned so that its surfaces are generally parallel to or co-planar with plane P1 and its edges are generally perpendicular to plane P1. Similarly, the housing 22 and the display 18 are positioned along a second plane identified by P2. Thus, as illustrated, plane P2 may be generally parallel to or coplanar with a front surface of the housing and/or the surface of the display 18 and generally perpendicular to the side or edge surfaces of the housing 22 (in embodiments of the device 10 where the edge surfaces of the housing 22 are generally perpendicular to the from or rear surfaces of the housing). In specific embodiments, the plane P2 may further/or alternatively be parallel with the rear surface of the housing 22. Likewise, the circuit board 28 is positioned along a third plane identified by P3 so that one or both surfaces of the circuit board 28 are parallel to or coplanar with plane P3.

In one embodiment, the plane P1 along which the antenna 30 is positioned is generally parallel to the plane P2 which passes through the housing 22. In another embodiment, the plane P1 is generally parallel to the plane P3 along which the circuit board is positioned. In a specific embodiment, the plane P1 is parallel to both the planes P2 and P3. Thus, in exemplary embodiments, the antenna 30 may be positioned so that its surfaces are generally parallel to the circuit board, the front and/or rear surfaces of the housing 22, and/or the surface of the display. As used herein, "generally parallel" and "generally perpendicular" are understood to encompass some deviations from parallel or perpendicular caused by manufacturing tolerances, normal shifting and re-positioning of components during use, and other similar causes.

By configuring and mounting the antenna assembly 16 as described herein, reception of GPS signals is optimized while minimizing the overall size of the device 10 and eliminating protrusions from the housing 22. For example, by mounting the antenna 30 to a circuit board 28 which is positioned entirely within the housing, the personal navigation device 10 has no antenna protruding from its housing 22. In this manner, the housing may be made more esthetically pleasing (e.g., thinner, sleeker, etc.) than prior art devices which have antennas mounted on exterior surfaces of their housings. Also, by mounting the antenna 30 so that it is generally parallel with the housing 22, the display 18, and the circuit board 28, the housing 22 can be made thinner than known personal navigation devices in which the antennas are positioned generally perpendicular to their housings when the devices are in use, thus necessitating thicker housings and/or flip-type antennas.

In an exemplary embodiment illustrated, the invention is implemented with a personal navigation device 10 such as the one illustrated in FIG. 1. However, embodiments of the present invention can be implemented in various portable electronic devices. The personal navigation device 10 and its components illustrated and described herein are merely examples of a device and components that may be used to implement the embodiments of the present invention and may be replaced with other devices and components without departing from the scope of the invention.

The device 10 may also include other components not specifically described but necessary or desirable for its function. For example, the device 10 may include a speaker for providing audible instructions and feedback, a microphone for receiving voice commands, an infrared port for wirelessly receiving and transmitting data and other information from and to nearby electronics, and other information, and even a cellular or other radio transceiver for wirelessly receiving and transmitting data from and to remote devices. For example, the radio transceiver may permit the device 10 to communicate with a remote server. The device 10 may further include a number of I/O ports that permit data and other information to be transferred to and from the processing system 12 and the location determining component 14. The I/O ports may include a memory card slot for receiving removable memory cards and a USB port for coupling with a USB cable connected to another processing system such as a personal computer. Navigational software, cartographic maps and other data and information may be loaded in the device 10 via the I/O ports, the wireless transceivers, or the infrared port.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A portable electronic device, comprising:
a location determining component for receiving signals from an external source;
a processing system coupled with the location determining component for determining a location of the portable electronic device as a function of the signals;
a display coupled with the processing system for displaying information related to the location of the portable electronic device;
a housing on which the display is mounted and in which the location determining component and processing system are housed;
a circuit board contained within the housing on which the location determining component and the processing system are mounted, and
an antenna mounted to the circuit board opposite the display and coupled with the location determining component for assisting in reception of the signals,
wherein the antenna is fixedly positioned within the housing along a plane which is generally parallel with the display.

2. The portable electronic device as claimed in claim 1, further including a ground plane positioned between the antenna and the circuit board.

3. The portable electronic device as claimed in claim 2, further including a shield fence at least partially positioned between the ground plane and the circuit board.

4. The portable electronic device as claimed in claim 1, wherein the antenna is a patch antenna having a thickness of about 2 mm to 6 mm.

5. A personal navigation device, comprising:
a GPS receiver for receiving GPS signals from a plurality of GPS satellites;
a processing system coupled with the GPS receiver for determining a location of the personal navigation device as a function of the GPS signals;
a circuit board on which the GPS receiver and the processing system are mounted;
a display coupled with the processing system for displaying information related to the location of the personal navigation device;
a housing on which the display is mounted and in which the GPS receiver and processing system are housed; and
an antenna coupled with the GPS receiver for assisting in reception of the GPS signals,
wherein the antenna is mounted to the circuit board opposite the display along a plane which is generally parallel with the display and entirely enclosed within the housing.

6. The personal navigation device as claimed in claim 5, wherein the circuit board has an outer perimeter edge and wherein the antenna is positioned entirely within the outer perimeter edge.

7. The personal navigation device as claimed in claim 5, wherein the antenna is fixedly positioned along a plane which is generally parallel with a plane along which the circuit board is positioned.

8. The personal navigation device as claimed in claim 5, further including a ground plane positioned between the antenna and the circuit board.

9. The personal navigation device as claimed in claim 8, further including a shield fence at least partially positioned between the ground plane and the circuit board.

10. The personal navigation device as claimed in claim 5, wherein the antenna is a patch antenna.

11. The personal navigation device as claimed in claim 7, wherein the plane in which the antenna is positioned is generally parallel to a plane along which the display is positioned.

12. A personal navigation device, comprising:
a GPS receiver for receiving GPS signals from a plurality of GPS satellites;
a processing system coupled with the GPS receiver for determining a location of the personal navigation device as a function of the GPS signals;
a circuit board on which the GPS receiver and the processing system are mounted, the circuit board having an outer perimeter edge;
a display coupled with the processing system for displaying information related to the location of the personal navigation device;
a housing on which the display is mounted and in which the GPS receiver, the processing system, and the circuit board are housed; and
an antenna assembly coupled with the GPS receiver for assisting in reception of the GPS signals, the antenna assembly including a ground plane and a patch antenna positioned at least partially over the ground plane,
wherein the antenna assembly is positioned entirely within the outer perimeter edge of the circuit board is mounted to the circuit board and entirely enclosed within the housing along a plane which is generally parallel with the display.

13. The personal navigation device as claimed in claim 12, wherein the ground plane is formed of approximately 0.2 mm to 0.3 mm thick cold rolled steel with a tin-plated coating.

14. The personal navigation device as claimed in claim 12, wherein the patch antenna has a thickness of approximately 2 mm to 6 mm.

15. The personal navigation device as claimed in claim 12, wherein the antenna assembly further includes a shield fence attached to the circuit board, the ground plane being positioned at least partially over the shield fence.

16. The personal navigation device as claimed in claim 15, wherein the shield fence is formed of approximately 0.2 mm to 0.3 mm thick cold rolled steel with a tin-plated coating.

17. A personal navigation device, comprising:
a housing having a generally planar front surface;
a circuit board mounted within the housing so that the circuit board is generally parallel with the front surface of the housing;
a GPS receiver mounted to the circuit board for receiving GPS signals from a plurality of GPS satellites;
a processing system coupled with the GPS receiver, the processing system operable for determining a location of the personal navigation device as a function of the GPS signals;
a display mounted within the front surface of the housing and coupled with the processing system, the display operable for displaying information related to the location of the personal navigation device; and
an antenna assembly mounted to the circuit board opposite the display along a plane generally parallel with the front surface of the housing and coupled with the GPS receiver for receiving the GPS signals, the antenna assembly including a shield fence attached to the circuit board, a ground plane positioned at least partially over the shield fence and a patch antenna positioned at least partially over the ground plane.

18. The personal navigation device as claimed in claim 17, wherein the ground plane is formed of approximately 0.2 mm to 0.3 mm thick cold rolled steel with a tin-plated coating.

19. The personal navigation device as claimed in claim 17, wherein the shield fence is formed of approximately 0.2 mm to 0.3 mm thick cold rolled steel with a tin-plated coating.

20. The personal navigation device as claimed in claim 17, wherein the patch antenna is generally rectangular in shape and has a thickness of approximately 2 mm to 6 mm.

* * * * *